United States Patent
Matlis et al.

(10) Patent No.: US 7,275,013 B1
(45) Date of Patent: Sep. 25, 2007

(54) PLASMA ANEMOMETER AND METHOD FOR USING SAME

(75) Inventors: Eric Matlis, Mishawaka, IN (US); Thomas Corke, Granger, IN (US); Sivaram Gogineni, Beavercreek, OH (US)

(73) Assignee: University of Notre Dame DuLoc, Notre Dame, IN (US)

( * ) Notice: Subject to any disclaimer, the term of this patent is extended or adjusted under 35 U.S.C. 154(b) by 0 days.

(21) Appl. No.: 11/229,551

(22) Filed: Sep. 20, 2005

Related U.S. Application Data

(60) Provisional application No. 60/610,951, filed on Sep. 20, 2004.

(51) Int. Cl.
*G01F 1/58* (2006.01)
*G01F 1/00* (2006.01)
*G01F 1/05* (2006.01)
*G01F 1/20* (2006.01)
*G01F 1/56* (2006.01)
*G01F 1/60* (2006.01)

(52) U.S. Cl. ............... 702/144; 73/170.01; 73/170.02; 73/170.11; 73/488; 73/861; 324/160; 324/166; 702/33; 702/45; 702/49; 702/127; 702/142

(58) Field of Classification Search ............ 73/170.01, 73/170.02, 170.11, 488, 504.05, 509, 861; 324/306, 160, 166, 178; 372/69, 76, 81, 372/87; 381/166, 167; 702/33, 45, 47, 49, 702/127, 142, 144

See application file for complete search history.

(56) References Cited

U.S. PATENT DOCUMENTS 5,864,212 A * 1/1999 Sullivan .................... 315/205

OTHER PUBLICATIONS

Gogineni: "High-Bandwidth High-Resolution Sensor for Hypersonic Flow", Abstract published as part of the DoD STTR Program Phase I Selection for FY03, Contract #: F49620-03-C-055, ID#: F033-0195, Agency: AF, Topic #: 03-013 Awarded Sep. 2, 2003, found at dodsbir.net/selections/sttr1_03.htm (Abstract Only).*

Gogineni et al: "Robust High-Bandwidth Plasma Anemometer for Hypersonic Vehicle Applications", American Institute of Aeronautics and Astronautics Dayton-Cincinnati Section, Session 7 Flow Diagnostics & Measurement of the Book of Abstracts 29th annual Dayton-Cincinnati Aerospace Science Symposium, Mar. 9, 2004, found at aiaa-daycin.org/uploads/media/2004_AbstractBook.pdf (Cover sheet and Abstract only).*

(Continued)

*Primary Examiner*—Edward R Cosimano
(74) *Attorney, Agent, or Firm*—Jagtiani + Guttag

(57) ABSTRACT

Methods and systems are described for a system for obtaining information regarding a flow. These methods and systems comprise a signal generator configured to generate an alternating current signal at a carrier frequency and a transformer arranged to receive the generated signal, wherein the transformer and carrier frequency are selected so that the generated signal resonates at the carrier frequency. The alternating signal is then used to cause plasma to form across a gap between two electrodes, wherein the voltage drop across the gap is directly proportional to the flow's velocity. This voltage may then be measured to determine the flow velocity.

33 Claims, 9 Drawing Sheets

OTHER PUBLICATIONS

Matlis, et al. "A.C. Plasma Anemometer for Hypersonic Mach Number Experiments." AIAA-2005-952. 43rd AIAA Aerospace Sciences Meeting and Exhibit, Reno, Nevada, Jan. 10-13, 2005.

Enloe, et al. "Mechanisms And Response of A Single Dielectric Barrier Plasma Actuator: Plasma Morphology." AIAA Paper 2003-1021, 2003.

Enloe, et al. "Mechanisms and Responses of a Single Dielectric Barrier Plasma Actuator: Geometric Effects." AIAA Journal 42, 595, 42, 595, May 2004.

Fucks, Wilhelm. "Investigation Of the Operating Properties Of the Leakage Current Anemometer." National Advisor Committee For Aeronautics. Technical Memorandum No. 1178, Dec. 8, 1947.

Lindvall, Frederick C. "A Glow Discharge Anemometer." Electrical Engineering, vol. 53, No. 7, Jul. 1934, pp. 1068-1073.

Mettler, Ruben Fred. "The Anemometric Application Of An Electrical Glow Discharge In Transverse Air Stream." California Institute Of Technology, Pasadena, California, 1949. Thesis in Partial Fulfillment of the Requirements For the Degree OF Doctor Of Philosophy.

Vrebalovich, Thomas. "The Development Of Direct- And Alternating—Current Glow—Discharge Anemometers For The Study Of Turbulence Phenomena in supersonic Flow." Report No. 20-81. Jet Propulsion Laboratory California Institute of Technology. Pasadena 3 California, Jun. 30, 1954.

Matlis, et al. "Quantitative Hot-Wire Measurements In Supersonic Boundary Layers." FEDSM2003-45080. Proceedings of FEDSM'03. 2003 ASME/JSME Joint Fluids Engineering Conference. Jul. 6-11, 2003, Honolulu, Hawaii USA.

Post, et al. "Separation Control On High Angle Of Attack Airfoil Using Plasma Actuators". AIAA Journal, vol. 42, No. 11, p. 2177-2184, Nov. 2004.

Morkovin, Mark V. "Fluctuations And Hot-Wire Anemometry In Compressible Flows." AGARDograph. North Atlantic Treaty Advisory Group For Aeronautical Research And Development (Organisation Du Traite De L'Atlantique Nord), Nov. 1956.

Sheplak, et al. "Progress In Hot-Film Anemometry For Hypersonic Flow." Experimental Thermal and Fluid Science. 1996; 13:21-28.

Werner, Frank David. "The Corona Anemometer And Its Application To Study Of The Effect Of Stilling Chamber Turbulence On Test Section Turbulence In A Wind Tunnel At Mach Number Three." A Thesis Submitted to the Graduate Faculty Of the University Of Minnesota 1955.

\* cited by examiner

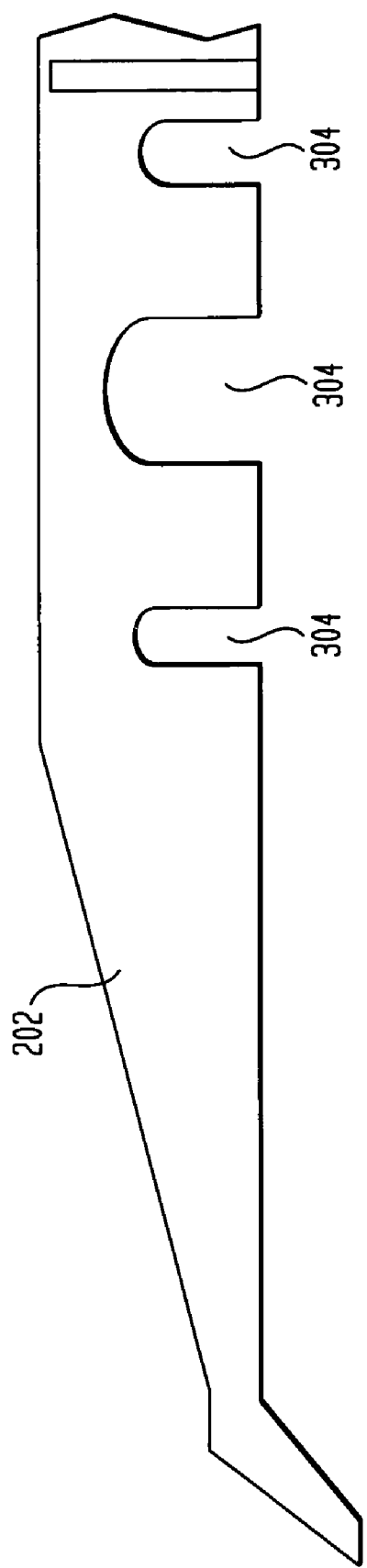

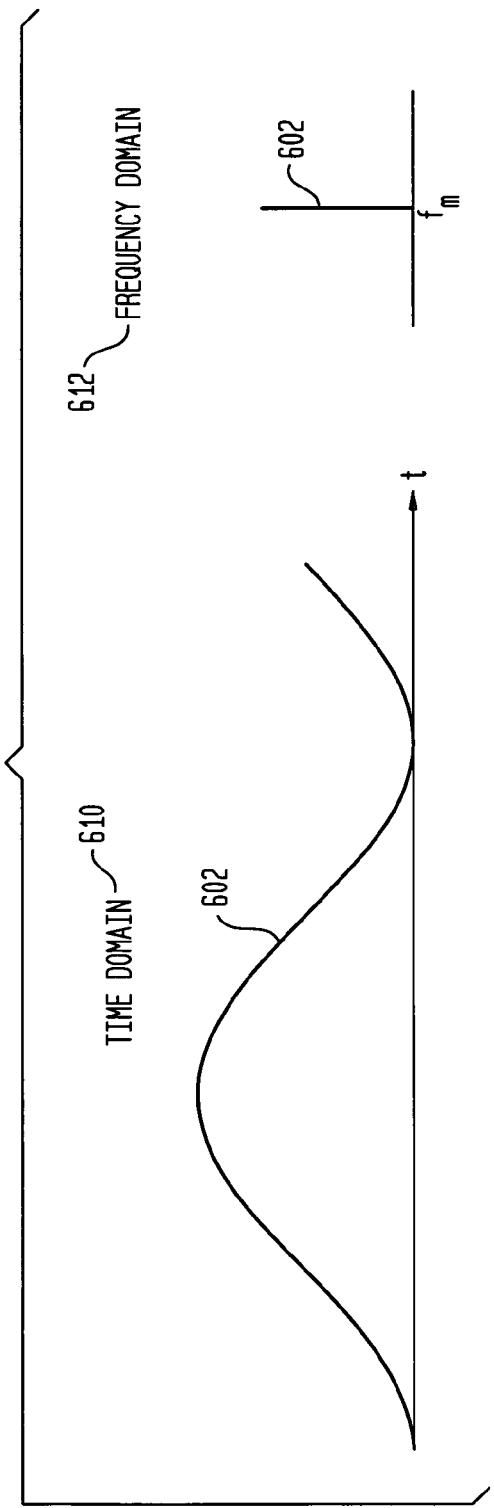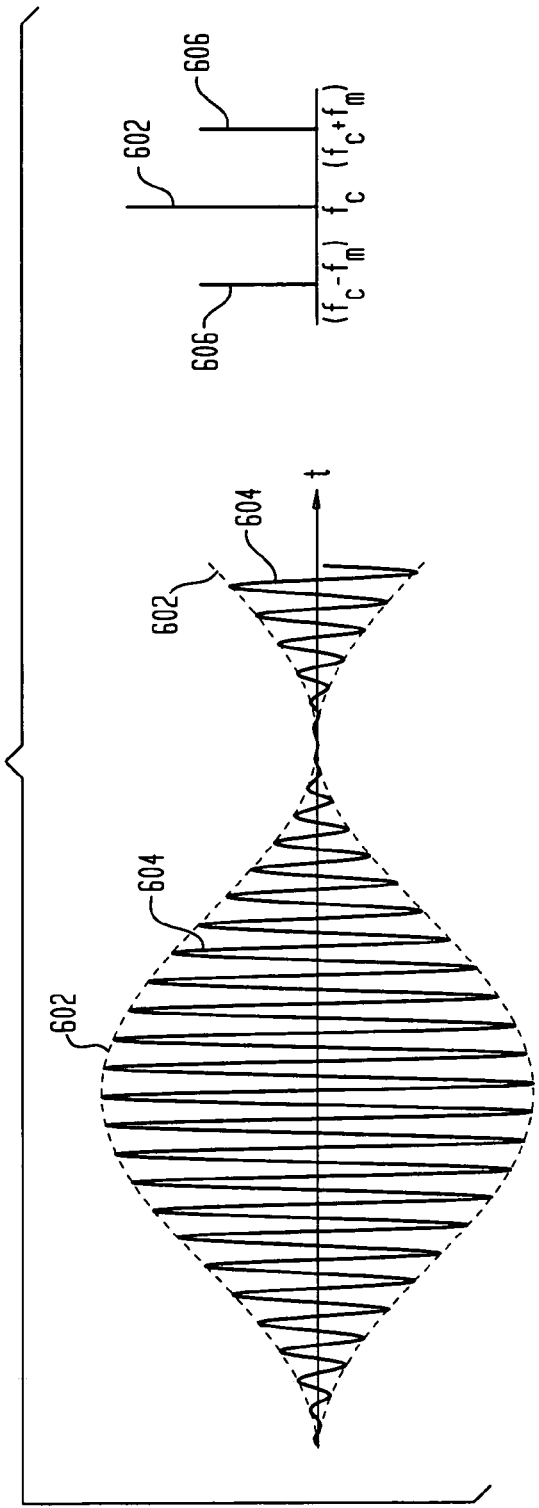

PLASMA ANEMOMETER AND METHOD FOR USING SAME

CROSS-REFERENCE TO RELATED APPLICATIONS

This application claims priority from U.S. Provisional Application No. 60/610,951, filed Sep. 20, 2004, entitled "AC Plasma Anemometer for Hypersonic Mach Number Experiments," now expired and which is hereby incorporated by reference herein.

GOVERNMENT INTEREST STATEMENT

The United States Government owns rights in the present invention as research relevant to the development of the invention was supported by United States federal funds from the Air Force Office of Scientific Research, Contract/Grant Number F49620-03-C-0055.

BACKGROUND

1. Field of the Invention

The present invention relates generally to measurement systems, and more particularly, to methods and systems for a plasma anemometer and methods for using same.

2. Related Art

In recent years there has been a renewed interest in obtaining measurements in high-speed, high enthalpy flows where high-bandwidth sensitivity to mass-flux is desirable. The objectives of this research includes clarifying the mechanisms of stability and transition to turbulence caused by high-speed compressible boundary layers, the unsteady aspects of shock-boundary layer interactions at high Mach numbers, and high-speed flows in compressors and turbines where high shear rates and velocity gradients complicate traditional measurement techniques. Improved predictions of transition Reynolds numbers are also needed in aeronautics applications such as high-speed vehicles or earth re-entry systems. Improved information regarding shock interactions are also needed for designing improved supersonic inlets for air breathing engines of supersonic aircraft. Further, improved information regarding the rotating-machinery class of flows is important for the design of a new and efficient generation of turbo fan engines.

Despite the needs for mass-flux measurements in these environments, there is little accurate data with which to develop empirical criteria or to validate numerical simulations that might be used in the design of new equipment. The difficulty largely comes from the extreme experimental regime that includes high aerodynamic (steady and dynamic) loads, high temperatures, small scales, and large gradients in the measured quantities.

Thermal based sensors have traditionally been used for high-bandwidth measurements where high spatial sensitivity is required. These sensors include hot-wires and hot films. The basic principle is that the temperature of the sensors, determined through a resistance-temperature relationship, is a function of the forced-convective heat transfer. The heat transfer is simultaneously a function of velocity, temperature and density. In incompressible flows where density is constant, the sensitivity to temperature can be minimized by operating the sensor at a high overheat temperature, so that the output is principally proportional to velocity. At compressible Mach numbers, this simplification is not accurate, and the effect of all three independent quantities needs to be accounted for in the sensitivity response function of the sensor. This greatly complicates the procedure for calibration of the sensor. Further, small-diameter suspended hot-wires have a lower thermal mass, which improves their frequency response. However, they are very fragile, especially when compared to hot-film probes. Further problems with surface-mounted sensors, such as hot-films, include a possible severe mismatch in thermal expansion coefficients between the sensor and substrate materials that can lead to damaging mechanical stresses in the substrate, even in moderate-enthalpy hypersonic facilities.

In addition to thermally based sensors, plasma anemometers have also considered for measuring flows. For example, prior experimentation into plasma anemometers was conducted by Mettler, Werner, and Vrebalovich. See, Mettler, R., "The Anemometric Application of an Electrical Glow Discharge in Transverse Air Streams, Ph.D thesis, California Institute of Technology, 1949; Werner F. D., "The Corona Anemometer and its Application to Study of the Effect of Stilling Chamber Turbulence on Test Section Turbulence in a Wind Tunnel at Mach Number Three," Ph.D thesis, University of Minnesota, 1955; and Vrebalovich, T., "The Development of Direct- and Alternating-Current Glow-Discharge Anemometers for the Study of Turbulence Phenomena in Supersonic Flow, Ph.D thesis, California Institute of Technology, 1954, JPL Report 20-81, respectively. These experimental plasma anemometers were be either alternating current (AC) plasma or direct current (DC) plasma anemometers, and demonstrated that a glow discharge may be made sensitive to fluid disturbances. However, these anemometers were limited to frequencies below 700 kHz, which limits frequency response and bandwidth of the sensor. Further, these anemometers were large and cumbersome and not practical for measurements of high speed flows requiring high spatial resolution. Nor were they operated in a constant current mode, which is necessary to maximize sensor response.

SUMMARY

In accordance with the invention, methods and systems are provided for obtaining information regarding a flow passing through a gap between two electrodes. These methods and systems comprise generating an alternating current signal at a carrier frequency using a signal generation device in combination with a transformer, wherein the carrier frequency is selected so that the generated signal resonates, causing a plasma to form across the gap between the two electrodes using the alternating current signal, measuring a voltage across the electrode gap, and determining the velocity of the flow based on the voltage across the gap.

In another aspect, methods and systems are provided for obtaining information regarding a flow. These methods and systems comprise a signal generator configured to generate an alternating current signal at a carrier frequency, a transformer arranged to receive the generated signal, wherein the transformer and carrier frequency are selected so that the generated signal resonates at the carrier frequency, and an electrode pair comprising a gap between the electrodes; wherein the electrode pair is constructed and arranged to cause plasma to form across the gap in response to the alternating current signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the claimed invention.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 3 illustrates a more detailed diagram of an electrode in accordance with one embodiment of the present invention;

FIGS. 6A-6B illustrate a sinusoidal flow disturbance's effect on a carrier wave in accordance with one embodiment of the present invention;

Reference will now be made in detail to exemplary embodiments of the present invention, an example(s) of which is (are) illustrated in the accompanying drawings. Wherever possible, the same reference numbers will be used throughout the drawings to refer to the same or like parts.

DETAILED DESCRIPTION

Embodiments of the present invention are generally directed to an AC driven, plasma anemometer for measuring flows at hypersonic Mach numbers. Such an anemometer uses a plasma discharge formed between two encapsulated electrodes as the primary sensing element. The plasma discharge is preferably driven by an Alternating Current (AC) power source, such as a low power (e.g., less than 5 Watt) AC source. Certain embodiments of the plasma anemometer include one or more of the following advantages: it requires no frequency compensation up to its AC carrier frequency, has an amplitude-modulated output that has excellent common-mode rejection with a signal-to-noise ratio that is improved over the output generated by hot-wire devices, does not include a sensor element that could easily break, it may have a small spatial volume, and is insensitive to temperature variations making it easier to calibrate than thermal-based sensors, and it may be operated across a myriad of different pressures (e.g., from very low pressures such as in a vacuum to very high pressures) and is temperature independent. These and/or other features and advantages enable embodiments of the Further, plasma anemometers of the present invention to be used in a variety of applications and environments, such as, for example, for measurements in a turbine (e.g., gas-turbine machinery), shock tubes, shock-boundary layer experiments, high-enthalpy hypersonic flows, and in plasma tunnels.

Figure 1:
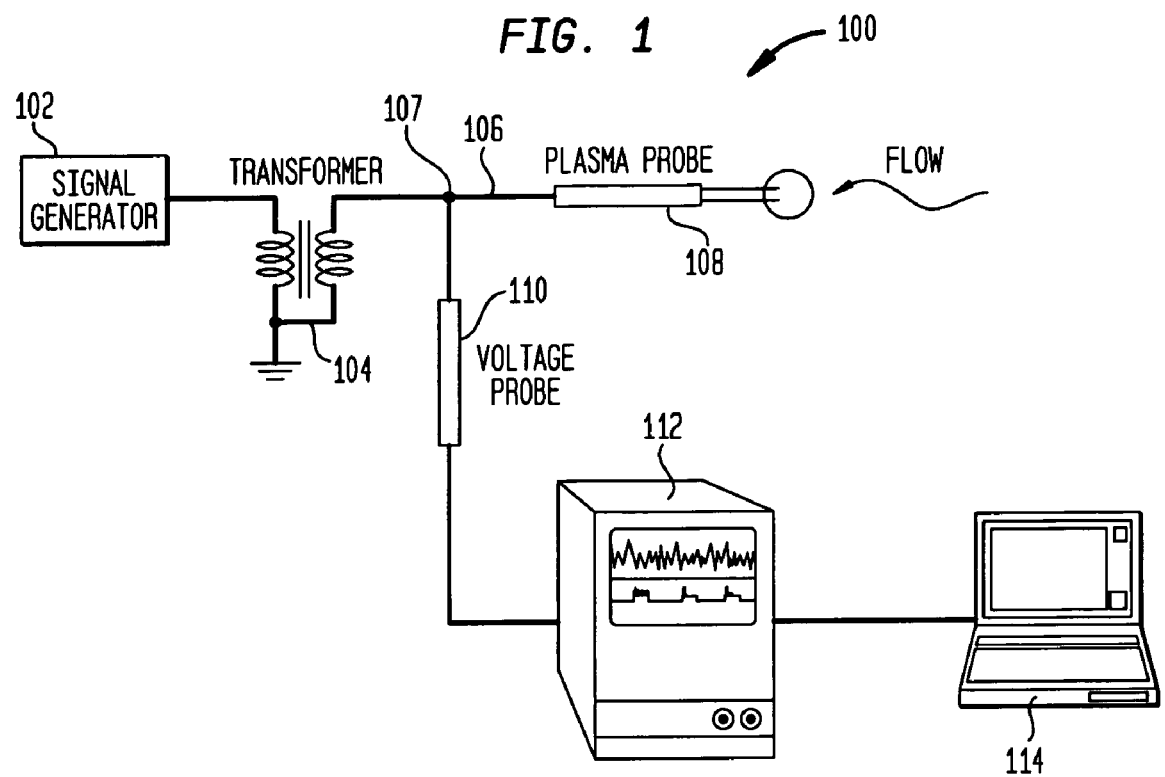
FIG. 1 illustrates a simplified diagram of an AC plasma anemometer in accordance with one embodiment of the present invention.

FIG. 1 illustrates a simplified diagram of an AC plasma anemometer, in accordance with an embodiment of the invention. As illustrated, plasma anemometer includes a signal generator 102, a transformer 104, a cable 106, a plasma probe 108, a voltage probe 110, a signal measurement device 112, and a computer 114. Signal generator 102 may be any type of suitable system for generating a periodic voltage or current signal, such as, for example, an AC signal. Signal generator 102 may be, for example, a solid state amplifier, such as the AG1006 model signal generator commercially available from TCPowerconversion, Inc. The AG1006 amplifier is a 300 Watt class A/B generator/amplifier that may be computer controlled and which contains an internal oscillator for signal generation, but can also accept an external signal source. In an embodiment the external signal source port may be used for receiving a signal from a signal generation device that is then amplified by the AG1006 amplifier.

Transformer 104 may be any type of transformer, such as a high-frequency step-up transformer. The operating frequency of signal generator 102 is chosen so that in operation it places signal amplifier 102 and transformer 104 in a "resonant" mode characteristic of a tank-circuit. This operating frequency will hereinafter be referred to as the carrier frequency, $F_c$. In one embodiment, transformer 104 is designed to resonate at a frequency of approximately 800 kHz or greater. For exemplary purposes, transformer 104 will be described as having a resonant frequency of either 1 MHz or 2 MHz; however, in other embodiments other frequencies may be used without departing from the invention.

As described in further detail below, signal amplifier 102 and transformer 104 together generate a high voltage AC signal at frequency $F_c$. The generated AC signal may have any of a variety of waveforms such as, for example, sinusoidal, square, triangular, saw tooth, etc. Because a sinusoidal waveform typically produces fewer harmonics than these other waveforms, the generated AC signal in the presently described embodiments will be described as having a sinusoidal waveform.

Plasma probe 108 preferably includes two closely spaced electrodes and is connected to transformer 104 via a cable 106. Cable 106 is preferably cabling capable of carrying high voltage signals. The AC signal is provided, via cable 106, to plasma probe 108 and a plasma discharge is generated between the two electrodes. A more detailed description of an exemplary plasma probe 108 is provided below.

The plasma anemometer, which, as illustrated, includes signal generator 102, transformer 104, cable 106 and plasma probe 108, represents an RLC circuit, with the resistance, R, and capacitance, C, represented by the plasma probe 108 and cable 106, and inductance, L, by transformer 104. Thus, the overall impendence of the system is frequency dependant and has an optimum frequency (i.e., the resonant frequency) at which the output voltage will be a maximum. Operating the circuit at this resonant frequency greatly helps in achieving sufficient voltage to initiate a plasma discharge between the electrodes of plasma probe 108. Additionally, transformer 104 preferably has a resistance much greater than the resistance of cabling 106 and plasma probe 108. This results in the delivery of a constant current to plasma probe 108 while plasma forms between the electrodes of the probe regardless of variations in the resistance across plasma probe 108 during operation of the system. As one of ordinary skill in the art would be aware, small variations in the current may occur in such a constant current system. As such, as used herein, the term "constant current" should be understood to mean that the current is essentially constant and that small variations in the current may exist. A further description of exemplary methods for generating plasma between the electrodes the plasma probe is provided below.

In operation, the system is tuned to resonate by adjusting the frequency of signal generator 102. When tuned, the power draw by plasma probe 108 is less than 5 Watts. Because the voltage of the system drops dramatically at frequencies other than resonant frequency, the length of cable 106 is preferably kept to a minimum to avoid capacitance losses that may reduce the resonant frequency of the system. Further, in one embodiment, the system may be monitored in real-time to ensure that the system remains in resonance. This may be accomplished manually or by, for example, hardware and/or software that monitors the system and automatically adjusts the frequency of signal generator 102 to ensure the system remains in resonance.

Plasma anemometer also, as illustrated, includes a voltage probe 110 that measures the output of the plasma probe 108. Voltage probe 110, as shown, is connected to cable 106 at a "T" junction on cable 106 and also to signal measurement device 112. Because in the exemplary embodiment the voltage is very high, a 1000:1 probe may be used to reduce the voltage so as not to harm signal measurement device 112. In one embodiment, voltage probe 110 is a Lecroy 1000:1 high-voltage high-bandwidth probe. Further, as will be discussed in further detail below, an AM receiver may be used in place of voltage probe 108 in order to take advantage of the AM transmission characteristics of the generated plasma.

Signal measurement device 112 may be any device capable of acquiring a waveform. For example, signal measurement device 112 may be an oscilloscope, such as a digital oscilloscope commercially available from Agilent Technologies and Lecroy. Or, for example, signal measurement device 112 may be digital radio like device (e.g., a GNU radio) or other hardware and/or software capable of acquiring the waveform of the signal on cable 106. For explanatory purposes, signal measurement device 112 will be described as an oscilloscope in the embodiments described herein.

In operation, signal measurement device 112 acquires the waveform of the signal on cable 106 and transfers the waveform to computer 114, which analyzes the acquired signal. Computer 114 may be, for example, any standard processor based system, such as, but not limited to, a laptop computer, a desktop computer, a workstation, a hand held computer. Additionally, rather than employing a separate signal measurement device 112 and computer 114, in certain embodiments these devices are combined into a single device. The combination of signal measurement device 112 and computer 114, whether separate or a combined device, will hereinafter be referred to as the signal analysis system. A more detailed description of a method for analyzing the acquired signal to obtain information regarding the flow is provided below.

Figure 2:
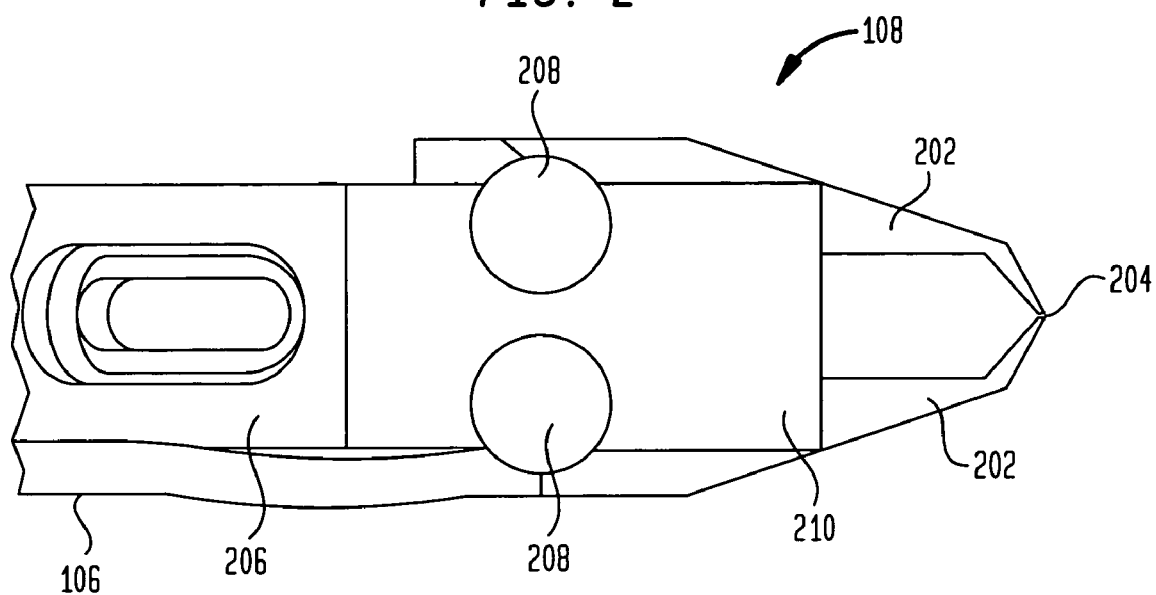
FIG. 2 illustrates a more detailed diagram of an exemplary plasma probe in accordance with one embodiment of the present invention.

FIG. 2 illustrates a more detailed diagram of an exemplary plasma probe 108. As illustrated, plasma probe is formed from two electrodes 202 separated by a small air gap 204. The electrodes 202 are preferably very thin, such as for example, less than approximately 0.1 mm. In one embodiment, electrodes 202 are photo-etched by a conventional chemical milling process out of 0.457 mm (0.0018 in.) stainless hardened steel. Using a chemical milling process may help to ensure a precise geometry of the electrodes which increases the accuracy of the resulting measurements. Additionally, electrodes 202 may be manufactured from a variety of materials, such as, for example, stainless steel, tungsten, platinum, etc.

Electrodes 202 may also be coated with a dielectric material to reduce the likelihood that plasma formed between electrodes 202 during operation of the system will sputter. This may also aid in improving the life of electrodes 202 and the accuracy of the measurements. This dielectric coating may be a very thin coating on the order of 1-3 microns and may be applied in an evacuated chamber as is well known to those of ordinary skill in the art. Further, the dielectric coating may be, for example, an oxide layer, such as, for example, silicon dioxide.

Further, electrodes 202 may be fabricated as joined pairs that can be separated along a thinned section at the center. FIG. 3 illustrates a more detailed diagram of an electrode 202. In this example, each electrode is 2.92 cm (1.15 in.) in length, although in other embodiments electrodes of longer and shorter lengths may be used. Further, electrodes 202 are preferably designed with cut-outs 304 to allow placement of locating screws that may be used to adjust electrodes 202 and/or gap 204.

Figure 4A:
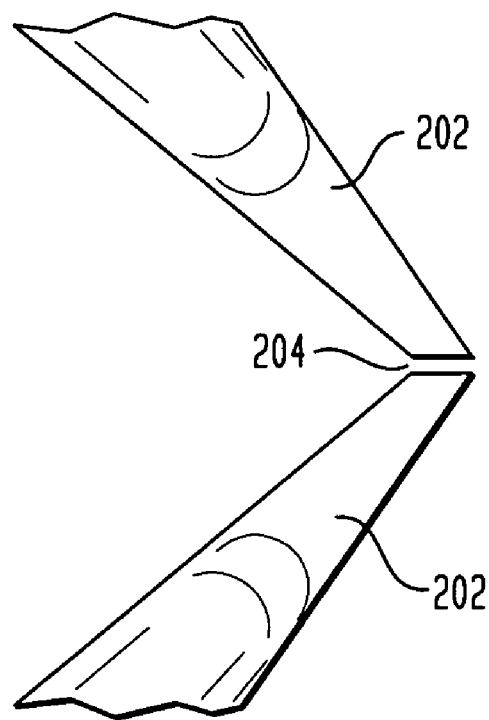
FIGS. 4A-4B illustrate close-up views of the electrodes in accordance with one embodiment of the present invention.
Figure 4B:
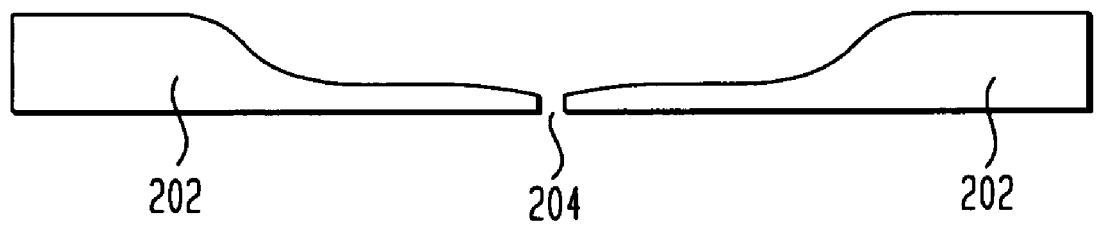

As shown, electrodes 202 are inserted into a fixture 206 and screws 208 are used to secure the electrodes into place. Fixture 206 may be, for example, a plastic fixture and screws 208 may be nylon screws. In this embodiment, fixture 206 was manufactured from a 1.27 cm (0.5 in) diameter plastic rod. A 0.51 mm (0.02 in.) slot was then cut to accept the electrodes, and screws 208 were used to "pinch" the sleeve to securely capture the electrodes. Further in this example, the tips of electrodes were etched to less than half the thickness of electrodes 202 by a milling process (e.g., less than half of 0.457 mm) to reduce aerodynamic blockage in the region of plasma discharge. Further, in this embodiment, electrodes 202 were prepared for use by lightly sanding with 600 grit Emory paper along the section at the tip to remove any imperfections or contamination deposited during the chemical milling process. This may be accomplished by, for example, running a feller gage encased in Emory paper back and forth in the gap so that the tips are substantially parallel to ensure an even and well-controlled discharge. Additionally, plasma probe 108 may be mounted on a sting in such a way that the general form factor is similar to a hot-wire. FIGS. 4A-4B provide two close-up views of electrode tips and gap 204. FIG. 4A illustrates a side view and FIG. 4B illustrates an end view.

In this embodiment, it is desirable to ensure that gap 204 is not set too large thus allowing plasma to escape into the free-stream and "flap." This behavior may produce strong sinusoidal fluctuations and higher harmonics in the AC carrier that may saturate the signal to be measured, thus making it more difficult to obtain accurate information regarding the flow. Further, it is desirable that the power (amplitude) of the carrier signal for generating the plasma also not be set to too high a value, which may also result in the plasma escaping. Further, it is desirable that the power (amplitude) of the carrier signal for generating the plasma also not be set too low a value, which may also result in the plasma turning off or operating in an intermittent fashion. Preventing plasma escape and intermittent plasma along with maintaining precise electrodes, such as those discussed above, helps to ensure both that the measured voltages are directly proportional to the flow's velocity and that the measurements are repeatable.

The formation of plasma between electrodes 202 is initiated by adjusting the frequency of signal generator 102 to bring the system into resonance, which maximizes the output through the transformer 104. This is preferably done by initially setting signal generator 102 to a low input power level below the threshold necessary to start the discharge. The power of signal generator 102 is then increased to the point where a glow-discharge is formed. Depending on the gap size and pressure, this initiation voltage may be, for example, in the range of 700-1000 $V_{rms}$ as measured by voltage probe 110. After the plasma has initiated, it may be desirable to reduce the input power slightly on the amplifier because the power require to sustain the plasma is less than the power required for initiating plasma formation. Further, as discussed above, after generation of the plasma, too large of a voltage may result in the plasma escaping, thus making it more difficult to obtain accurate flow measurements.

Once the plasma has started, in this exemplary embodiment, the voltage across the electrodes instantly drops (e.g., to as low as 330 $V_{rms}$) due to the current flowing through the plasma. During operation, the voltage varies between these two limits (i.e. 700-1000 $V_{rms}$ and 330 $V_{rms}$ in this example) depending on the flow velocity. Further, it is also desirable during operation to monitor the plasma to ensure that the amplitude of the voltage be set to ensure the plasma between electrodes of plasma probe 108 is continuous. For example, if the voltage is allowed to drop too low, the plasma may sputter or become intermittent, which may make it more difficult to obtain accurate flow measurements. Further, as discussed above, if the voltage becomes too large, the plasma may escape which may also make it more difficult to obtain accurate flow measurements. As such, in operation, it is desirable that the amplitude of signal generator 102 be monitored and adjusted to ensure that it does not become too low (and result in intermittent plasma) nor become too large (and result in the plasma escaping). This may be accomplished by, for example, a person or hardware, and/or software monitoring the plasma and adjusting the amplitude of signal generator 102 as necessary to ensure continuous plasma while also ensuring the plasma does not flap.

The following provides a more detailed description of the effects of the flow on the plasma and its impact on the voltage drop across the electrodes and how these voltage variations may be used to determine information regarding the flow, such as the flow's velocity and disturbances in the flow.

Figure 5A:
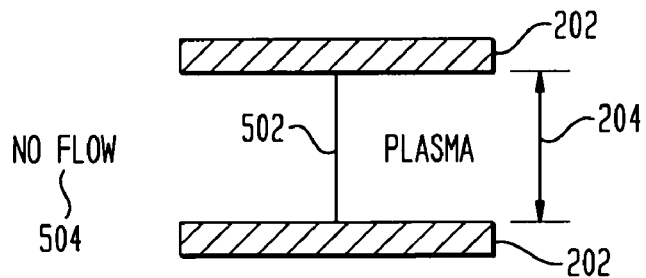
FIGS. 5A-5D illustrate exemplary plasma discharges between two-electrodes in the presence of different flows in accordance with one embodiment of the present invention.
Figure 5B:
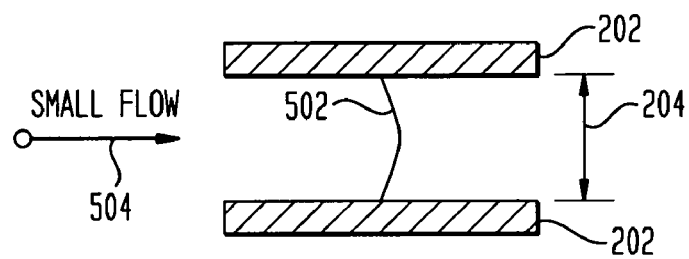
Figure 5C:
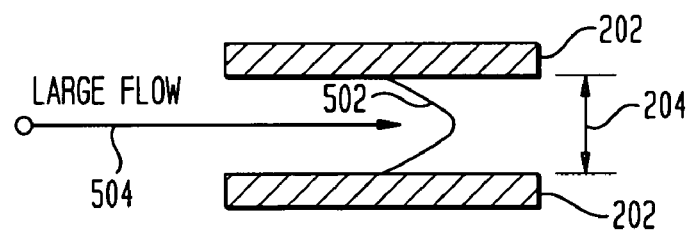
Figure 5D:
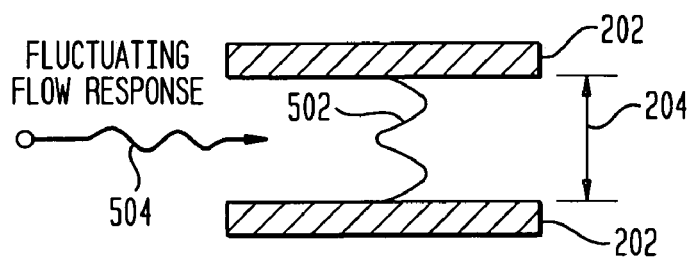

FIGS. 5A-5D illustrate exemplary plasma discharges between two-electrodes in the presence of different flows. As shown, FIG. 5A illustrates plasma 502 between electrodes 202 in the presence of no flow 504; FIG. 5B illustrates plasma 502 between electrodes 202 in the presence of a small flow 504; FIG. 5C illustrates plasma 502 between electrodes 202 in the presence of a large flow 504; and FIG. 5D illustrates plasma 502 in the presence of a time-dependent fluctuating flow 504.

The flow 504 may cause ions to be driven out of the gap causing the current density to increase in order to maintain a constant current, which in turn forces the voltage driving the plasma (also referred to as "glow discharge") to increase. This voltage increase is directly measurable and may be correlated to a change in flow velocity. Further, as illustrated, larger flows may cause plasma 502 to be deflected in gap 204. For example, plasma 502 "stretches" in response to increases in mean velocity of flow 504 and "vibrates" in response to time-dependent fluctuations in flow 504, as shown in FIG. 5D. These time-dependent fluctuations may be modeled as sinusoidal signals with a disturbance frequency, $F_m$.

It is possible to draw an analogy between the plasma 502 in gap 204 and a variable resistor. For example, the root-mean-square (r.m.s.) voltage of plasma 502 varies with the velocity of flow 504 through gap 204 as if a resistor was limiting the current across electrodes 202. That is, this "gap resistance" varies as the flow speed changes, thus changing the voltage drop across the gap. Thus, as the flow velocity on average increases, the mean voltage output from plasma probe 108 increases. This voltage increase or decrease may then be measured and the average flow velocity calculated. A further description of an exemplary method of calibrating the plasma anemometer and determining flow velocities is presented below.

In addition to determining the average speed of flow 504, the system may also be used to determine information regarding fluctuations in flow 504 (e.g, periodic disturbances in flow 504). For example, as discussed above with reference to FIG. 5D, periodic disturbances in flow 504 may cause plasma 502 to oscillate at a frequency, $F_m$. This plasma oscillation effectively modulates the AC carrier signal. When this modulated signal is analyzed in the frequency domain, the disturbance frequency, $F_m$ will appear as two side-bands equi-distant from the central peak at the carrier frequency, $F_c$ (i.e., at $F_c-F_m$ and $F_c+F_m$).

FIGS. 6A-6B illustrate a sinusoidal flow disturbance's effect on a carrier wave. FIG. 6A illustrates sinusoidal disturbance 602 as a function of time and as a function of frequency (i.e., in the time domain 610 and the frequency domain 612). FIG. 6B illustrates the effect of the sinusoidal disturbance 602 on the carrier signal 604 both in the time domain 610 and frequency domain 612. As shown, the distance between the peak of the carrier signal at carrier frequency, $F_c$, and each of the two sidebands 606 is equal to the frequency of the disturbance, $F_m$.

From a mathematical standpoint, the combined carrier signal 604 and sinusoidal disturbance 602 can be modeled as:

$$E = E_o(1 + m \sin \omega_m t)\sin(\omega_c t + \phi), \quad [1]$$

where,
$E_o$=peak amplitude of carrier signal,
$\omega_m$=modulating signal (disturbance) frequency (rad/s),
$\omega_c$=carrier frequency (rad/s),
m=modulation index,
$\phi$=arbitrary carrier phase angle (rand), and
t=time (s).

Expansion of this equation provides:

$$E = \quad [2]$$
$$E_o \sin(\omega_c t + \phi) + \frac{mE_o}{2}\cos[(\omega_c - \omega_m)t + \phi] - \frac{mE_o}{2}\cos[(\omega_c + \omega_m)t + \phi]$$

Note that the carrier signal is reproduced exactly as if it carried no modulation. The carrier signal in itself does not carry any information with regard to the time-varying component of the flow; only of the mean voltage across plasma probe 108. The second and third terms in this second equation represent sideband signals produced in the modulation process. These signals are displaced from the carrier signal in the frequency spectrum, on each side of the carrier, by a frequency difference equal to the modulation-signal frequency. The magnitudes of the sideband signals are equal and are proportional to the modulation index, m, where m is defined as:

$$m = \begin{cases} \dfrac{E_{max} - E_o}{E_o}; \text{ positive modulation} \\ \dfrac{E_o - E_{max}}{E_{max}}; \text{ negative modulation} \end{cases} \quad [3]$$

where, $E_{max}$=peak amplitude of modulated carrier signal, and
$E_o$=peak amplitude of un-modulated carrier signal.

The modulation index in this example represents the energy carried by the sinusoidal disturbance relative to the plasma carrier signal's amplitude.

The following provides a more detailed explanation of an exemplary method for analyzing the acquired waveform and may be implemented in software, hardware, or any combination thereof. As discussed above, signal measurement device 112 is connected to cable 106 via voltage probe 110. Signal measurement device 112 is preferably an oscilloscope. Signal measurement device 112 acquires the waveform of the signal provided to plasma probe 108 and provides the acquired waveform to computer 114 for analysis. The waveform, as discussed above, is a composite of the carrier signal at frequency, $F_c$, and disturbances to the flow at frequency $F_m$. When viewed in the frequency domain, this disturbance, appears in the spectra as two sidebands equidistant from the central carrier peak, i.e., at $F_c-F_m$ and $F_c+F_m$.

The acquired waveform is then decomposed to separate the carrier from the modulating signal in the frequency domain. The waveform may be converted from the time domain to the frequency domain using any of a number of techniques, such as, for example, by using a fast fourier transform (FFT) as is well known to one of skill in the art. The magnitude of the peak of the signal at the carrier frequency, $F_c$, represents the response of the plasma to mean flow conditions. As discussed above, the plasma responds to an increase in mean flow with a corresponding increase in the r.m.s. voltage of the carrier, due to an increase in "resistance" of the plasma. Additionally, since the magnitude of the carrier is typically far larger than the magnitude of the disturbance (i.e., modulation frequency), it is possible in practice to approximate the voltage over cable 106 to mean flow conditions simply by taking the total r.m.s. of the voltage of the time series acquired by signal measurement device 112 (e.g., an oscilloscope) without converting the signal from the time domain to the frequency domain. Since the carrier dominates the spectrum, this provides a close approximation of the energy of the carrier signal alone in the frequency domain and provides a good approximation of the mean voltage over cable 106. As discussed above, this mean voltage may then be used to calculate the mean velocity of the flow, as will be described in further detail below.

The sidebands (i.e. at $F_c-F_m$ and $F_c+F_m$) may be analyzed to determine information regarding the fluctuations in the flow introduced by periodic disturbances. The r.m.s. amplitude of these side-bands in the frequency domain represents the intensity of the disturbance as measured by voltage probe 110. A further description of an exemplary method for determining the intensity of the disturbance based on the amplitude of the sidebands is presented below.

The following provides a more detailed description of an exemplary method for calibrating a plasma anemometer and using the calibrated plasma anemometer to determine information regarding a flow. Prior to use of the plasma anemometer to measure unknown flows, the plasma anemometer is first calibrated. This may be accomplished by measuring the voltage across cable 106 when plasma probe 108 is in the presence of a variety of different constant flows of known velocity, including the situation where there is no flow. The voltage is then measured for each of these flows and the voltage and corresponding flow velocity stored. This information may be stored, for example, in a table stored in computer 114. After calibration, the plasma anemometer may be used to determine information regarding unknown flows. This may be accomplished by first determining the mean amplitude at the carrier frequency. As discussed above, this amplitude corresponds to the mean flow velocity. This amplitude may then be used to look up the corresponding velocity in the stored table. Further, for amplitudes falling between two entries in the table, linear analysis may be used to determine the mean velocity of the flow. In an alternative embodiment, rather than storing flow velocities and corresponding amplitudes in a table, the information obtained during calibration may be used to generate a formula for calculating the mean flow velocity based on amplitude. Then, the mean flow velocity may be determined by simply plugging the measured amplitude into this formula.

In addition to measuring the mean flow velocity, the plasma anemometer may also be used to measure information regarding a periodic disturbance to the flow. As discussed above, the frequency of this disturbance may be simply determined by examining the measured voltages in the frequency domain, where the difference between the carrier frequency and the side lobe peaks is equal to the frequency of the disturbance, $F_m$. Additionally, the intensity of this disturbance may be determined by measuring the voltage amplitude for the side lobe and looking up the corresponding flow velocity in the stored tables. Note that it is only necessary to look at one side lobe in determining the measured intensity and frequency of the flow disturbance. That is, the other side lobe is identical to the first and may be discarded in order to simplify signal processing as is well known to those of skill in the art. Further, in an alternative embodiment in which a formula is determined during calibration, the measured amplitude of the side lobe may simply be plugged into the formula to determine the intensity of the flow disturbance.

Figure 7:
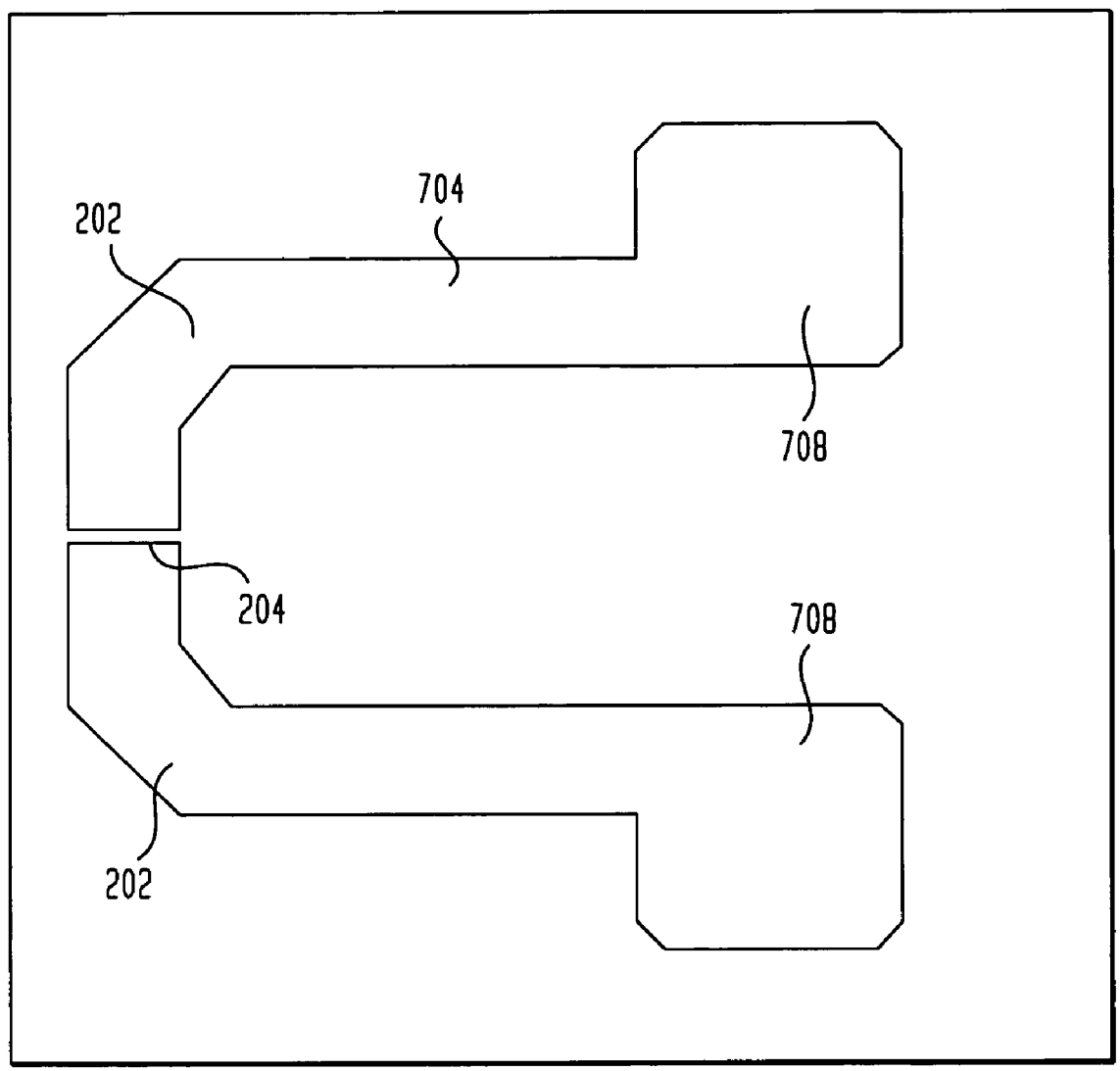
FIG. 7 illustrates a simplified block diagram of an exemplary silicon-based surface mounted plasma probe in accordance with one embodiment of the present invention.

In an alternative embodiment, a plasma anemometer in accordance with the invention may be manufactured on a much smaller scale than that discussed above. For example, the plasma anemometer may be manufactured using microelectronic (MEM) based technology. A small anemometer offers many advantages. For example, a small gap 204 between electrodes 202 of plasma probe 108 may dramatically reduce the voltages required to initiate plasma. According to Paschen's curve, the voltage necessary for initiating plasma may be as low as 300 $V_{rms}$. Paschens' curve is well know to those of skill in the art and is not discussed further herein. Further, in embodiments, surface mounted mems-scale plasma probes may be used. FIG. 7 illustrates a simplified block diagram of an exemplary silicon-based surface mounted plasma probe 108. This plasma probe 108 may be photo-etched on a silicon wafer using platinum traces 704 for the electrodes. Further, this wafer may be very small, and, for example in embodiments may be on the order of roughly 600 microns in length. Further, gap 204 may be on the order of 10 microns. Additionally, as shown, plasma probe 108 may include soldering pads 708 for connecting electrodes 202 of to cable 106.

Additionally, plasma 502 has amplitude modulated (AM) radio frequency (RF) characteristics. That is, plasma 502 results in an AM transmission. An embodiment, takes advantage of these AM RF characteristics by using an AM wireless receiver to receive this AM transmission. The use of an AM receiver may be beneficial in environments where access for traditional cabling may be difficult, or impossible, such as for example, in turbine-engine applications.

Figure 8:
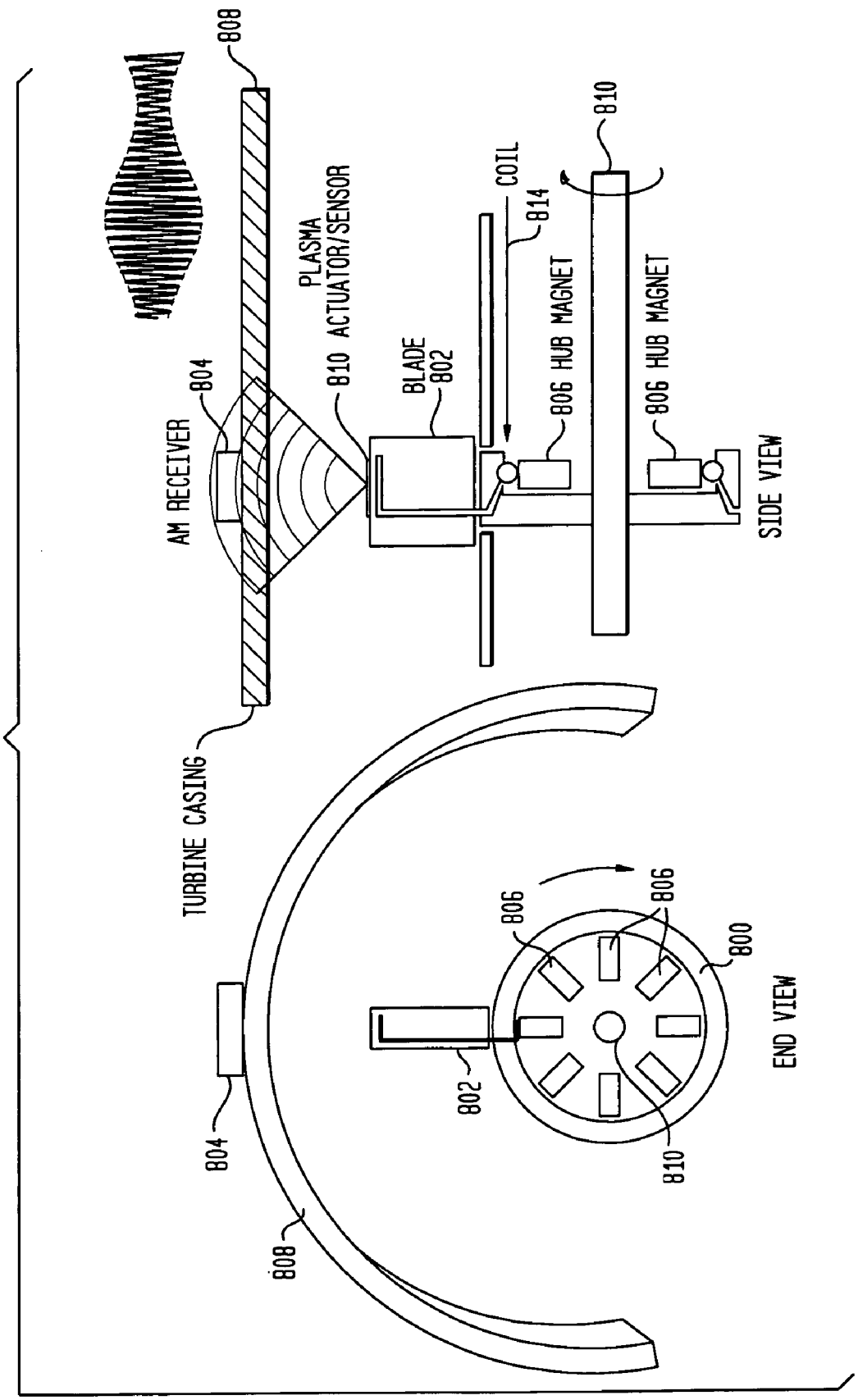
FIG. 8 illustrates a simplified diagram of a plasma anemometer that uses an AM receiver for wireless reception in a turbine environment in accordance with one embodiment of the present invention.

FIG. 8 illustrates a simplified diagram of a plasma anemometer that uses an AM receiver to receive a plasma's AM transmission in measuring the flow characteristics in a turbine environment. As illustrated, plasma probe 108 is mounted on a turbine blade 802 of turbine 800 and is connected to a coil 814. During operation of turbine 800, blade 802 rotates around a series of magnets 806, which causes a sinusoidal AC signal to be generated by coil 814. This AC signal is then used to generate plasma between the electrodes of plasma probe 810 in the same manner as discussed above. Further, a mems scale plasma probe 108 may be used, such as the silicon-based surface mounted plasma probe discussed above with reference to FIG. 7.

Further, as shown, an AM receiver 810 is mounted outside the turbine 800, such as, for example, on the turbine casing 804. AM receiver 810 may then be connected to a signal measurement device and computer, for analysis of the flow inside turbine 800. In operation, plasma anemometer generates plasma across electrodes of plasma probe 108, thus generating an AM wireless transmission. The plasma is then disturbed by the flow introduced in the turbine 800 during its operation. AM receiver 810 receives this AM transmission and passes the received signal to a signal measurement device and computer for analysis of the signal. This signal analysis may be performed in the same manner as discussed above. That is, this analysis may include, for example, analyzing the amplitudes of the main lobe and the sidebands of the received signal in the frequency domain to obtain information regarding the velocity of the flow along with the frequency and/or amplitude of any periodic flow disturbances, as discussed above.

As discussed above, signal measurement device 112 may be a digital radio like device (e.g., a Gnuradio). Because as discussed above, the plasma has properties similar to an AM radio transmission, a digital radio like device may be advantageous in certain embodiments. This device may be connected to computer 114 via, for example, a USB connection. Further, this digital radio device may for example receive the signal via voltage probe 110 or may use the AM radio like properties of the plasma to receive the information wirelessly. The digital radio like device may then convert the received signal from analog to digital and then take the Fourier Transform of the signal to convert it from the time domain to the frequency domain. This may be accomplished via, for example, a Fast Fourier Transform (FFT). Using the digital radio device to perform processing of the signals may help to offload some of the information from the computer's 114 processor to help increase overall processing speed. Further, this digital radio device may provide virtual oscilloscope type functionality that allows the waveform to be displayed on the computer's 114 monitor in real time, giving the user rapid feedback on the performance of the probe. This digital radio device may be, for example, implemented in hardware, software and/or any combination thereof. Further, in other embodiments, the digital radio device may be implemented in computer 114 by hardware, software and/or any combination thereof.

Additionally, as discussed above, an automated feedback type system may be used to monitor the system and the generated plasma to ensure that the system remains in resonance and that the plasma does not "flap" nor become intermittent. This may be accomplished by, for example, hardware, software, and/or any combination thereof monitoring the system and automatically adjusting the frequency and/or amplitude of the signal generator. Further, this feedback type system may be combined with the digital radio system and computer, or they may be maintained as separate entities, or any combination thereof. Using an automated feedback system may be useful for obtaining real-time measurements for applications in real world environments, such as for example, environments with high speed high enthalpy flows (e.g., measuring the flows in a jet engine of a commercial or military aircraft for diagnostic purposes).

Figure 9A:
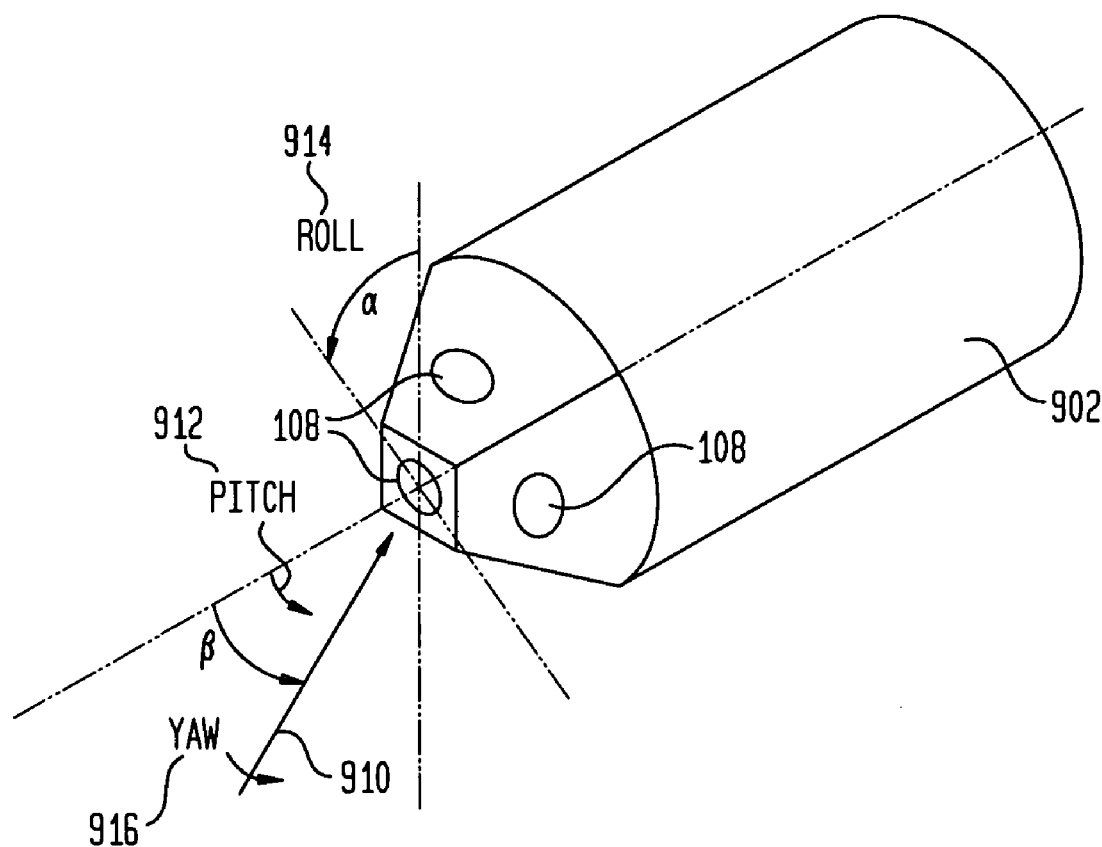
FIGS. 9A-9B illustrate an embodiment of an exemplary multi-sensor probe.
Figure 9B:
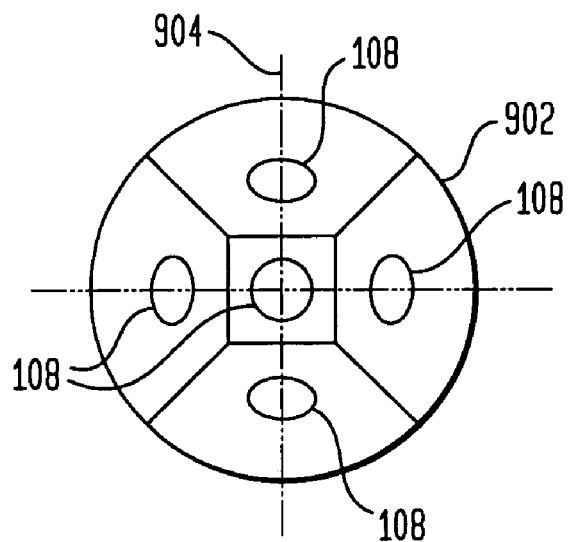

FIGS. 9A-9B illustrate an embodiment of an exemplary multi-sensor probe. As illustrated, multi-sensor probe 902 includes 5 plasma probes 108 aligned in different directions. Arranging these multiple plasma probes 108 in different directions, helps in resolving different flow angles where the precise direction of the flow is unknown. The geometry for this exemplary multi-sensor probe 902 is similar to that of a 5-hole pilot probe. Such a multi-sensor probe may be useful in obtaining pitch, roll, and yaw velocity measurements in 3-dimensional probes.

The operation of a multi-sensor plasma probe is similar to that of the above described embodiments. For example, an AC signals may be provided to each of the plasma probes 108 to cause plasma to form between the electrode pairs of each plasma probe 108. The AC signal for each of the plasma probes 108 may be generated, for example, by a common signal generator 102 and transformer 104 and provided to each plasma probe 108 by its own independent cable 106. For example, the AC signal coming out of transformer 104 may be split by a T-junction to provide AC signals to each of the plasma probes 108. Or, for example, transformer 106 may include multiple outputs that may be used to supply AC signals to each the plasma probes 108. Additionally, in an embodiment separate transformers 104 may be provided for each plasma probe 108. Further, in embodiments, a common ground cable may be used for each plasma probe 108.

As illustrated, each plasma probe 108 around the circumference of probe 902 is aligned in a different direction. The electrodes 202 of each plasma probe 108 are preferably aligned so that the gap 204 between the electrodes 202 is generally aligned with the direction of the flow they will be measuring. For example, in most environments in which flows are to be measured, general information regarding the flows direction is known even if the precise direction is unknown. This information may then be used to select the alignment of the gaps 204 between electrodes 202 of each plasma probe 108. For exemplary purposes, in this example, all electrode gaps 204 are aligned along the direction of axis 904.

The voltage drop across each plasma probe 108 may then be detected using a voltage probe 110, such as described above. This information may be used to determine the velocity of the flow in the different directions measured by each plasma probe 108, respectively, using, for example, processing identical to that discussed above. The velocities for each direction may then be used to determine information regarding the direction of the flow along with its velocity in this direction. Standard triangulation techniques, such as those well known to those of skill in the art, may be used to determine the flow direction and velocity once the flow velocities in the different directions are determined. For example, for flow 910, the voltages across plasma probes 108 may be used to determine the pitch 912, the roll 914, and the yaw 916 for the direction of flow 910. Likewise, the direction and intensity of disturbances to the flow may also be determined using similar triangulation techniques in conjunction with the techniques discussed above for determining for each plasma probe 108 the disturbances intensity and frequency.

As discussed above, the presently described embodiments of the plasma anemometer may be used in a variety of different applications for measuring information regarding flows. For example, it may be used for measuring flows in gas-turbine machinery (e.g., a jet engine turbine), shock tubes, in plasma tunnels, for performing shock-boundary layer experiments, for measuring high-enthalpy hypersonic flows, and for measuring other flows in aeronautical environments. Additionally, it may be used for performing cylinder wake measurements, boundary layer measurements, and hypersonic measurements, such as low pressure hypersonic measurements. A further description of results obtained for a working plasma probe for taking such exemplary measurements is provided in Eric H. Matlis, Thomas C. Corke, and Sivaram P. Gogineni, "A.C. Plasma Anemometer for Hypersonic Mach Number Experiments," 21st International Congress on Instrumentation in Aerospace Simulation Facilities (ICIASF), Aug. 29-Sep. 1, 2005, Sendai International Center, Sendai, Japan.; and Eric H. Matlis, Thomas C. Corke, and Sivaram P. Gogineni, "A.C. Plasma Anemometer for Hypersonic Mach Number Experiments," $43^{rd}$ AIAA Aerospace Sciences Meeting Proceedings, Jan. 10-13, 2005 (Reno, Nev.), both of which are incorporated herein in their entirety.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for obtaining information regarding a flow passing through a gap between two electrodes, comprising:
    generating an alternating current signal at a carrier frequency using a signal generation device in combination with a transformer, wherein the carrier frequency is selected so that the generated signal resonates;
    causing a constant current plasma to form across the gap between the two electrodes using the alternating current signal;
    measuring a voltage across the electrode gap; and
    determining the velocity of the flow based on the voltage across the gap.

2. The method of claim 1, wherein the electrodes are coated with a dielectric material.

3. The method of claim 1, wherein the electrodes are manufactured by a process involving chemical etching.

4. The method of claim 1, wherein measuring a voltage across the electrode gap comprises:
    receiving, using a voltage probe, an amplitude modulated signal transmitted over a wire as a result of the plasma formed across the gap.

5. The method of claim 1, wherein measuring a voltage across the electrode gap comprises:
    receiving an amplitude modulated signal wirelessly transmitted through electromagnetic waves as a result of the plasma formed across the gap.

6. The method of claim 1, wherein the electrodes are provided on a silicon wafer.

7. The method of claim 1, further comprising:
    monitoring the plasma; and
    adjusting one or more parameters of the signal generator based on the monitoring, wherein the one or more parameters include one or more of the carrier frequency and an amplitude of the signal generated by the signal generator.

8. The method of claim 1, wherein the flow is a flow resulting from one or more of the following: a turbine engine, a shock tube, and hypersonic aeronautical travel.

9. The method of claim 1, wherein the transformer is designed to resonate at a frequency of 800 kHz or higher.

10. The method of claim 1, further comprising:
    causing a constant current plasma to form across a gap between at least a second pair of two electrodes;
    measuring a voltage across the gap between the at least second pair of electrodes; and
    determining information regarding the direction of the flow based on the voltage across the gap between the two electrodes and voltage across the gap between the at least second pair of electrodes.

11. The method of claim 1, wherein determining the velocity of the flow comprises:
    converting the measured voltage from a time domain to a frequency domain;
    determining the amplitude of the signal in the frequency domain at the carrier frequency; and
    determining the velocity of the flow using the determined amplitude of the signal at the carrier frequency.

12. The method of claim 11, further comprising:
    identifying a side lobe of the voltage in the frequency domain;
    determining the amplitude of the side lobe;
    determining information regarding the intensity of a disturbance in the flow using the determined amplitude of the side lobe.

13. The method of claim 11, further comprising:
    identifying a side lobe of the voltage in the frequency domain;
    determining a center frequency of the side lobe;
    determining information regarding a periodic frequency of a disturbance in the flow using the determined center frequency of the side lobe.

14. A system for obtaining information regarding a flow, comprising:
    a signal generator configured to generate an alternating current signal at a carrier frequency;
    a transformer arranged to receive the generated signal, wherein the transformer and carrier frequency are selected so that the generated signal resonates at the carrier frequency; and
    an electrode pair comprising a gap between the electrodes; wherein the electrode pair is constructed and arranged to cause plasma to form across the gap in response to the alternating current signal.

15. The system of claim 14, wherein the electrodes are coated with a dielectric material.

16. The system of claim 14, wherein the electrodes are manufactured by a process involving chemical etching.

17. The system of claim 14, further comprising:
a voltage probe configured to detect a voltage of the alternating current signal;
a signal analysis system connected to the voltage probe; wherein the signal analysis system determines a flow velocity based on the detected voltage.

18. The system of claim 14, further comprising:
a receiver configured to receive an amplitude modulated signal transmitted through electromagnetic waves as a result of the plasma formed across the gap; and
a signal analysis system connected to the receiver; wherein the signal analysis system determines a flow velocity based on the received signal.

19. The system of claim 14, wherein the electrode pair is provided on a silicon wafer.

20. The system of claim 14, further comprising:
a feedback system configured to monitor the plasma and adjust one or more parameters of the signal generator based on the monitoring, wherein the one or more parameters include one or more of the carrier frequency and an amplitude of the signal generated by the signal generator.

21. The system of claim 14, wherein the flow is a flow resulting from one or more of the following: a turbine engine, a shock tube, and hypersonic aeronautical travel.

22. The system of claim 14, wherein the transformer is designed to resonate at a frequency of 800 kHz or higher.

23. The system of claim 14, further comprising:
at least a second electrode pair comprising a gap between the electrodes, wherein the electrodes are constructed and arranged to cause plasma to form across the gap; and
a processor configured to determine information regarding a voltage drop across the gap for the first electrode pair and a voltage drop across the gap for the second electrode pair and use the voltage drops to determine information regarding a direction of the flow.

24. The system of claim 14, further comprising:
a signal analysis system for determining a flow velocity for the flow, wherein the signal analysis system is configured to convert a measured voltage indicative of the voltage across the gap from a time domain to a frequency domain; determine the amplitude of the signal in the frequency domain at the carrier frequency; and determine the velocity of the flow using the determined amplitude of the signal at the carrier frequency.

25. The system of claim 24, wherein the signal analysis system is further configured to identify a side lobe of the voltage in the frequency domain; determine the amplitude of the side lobe; and determine information regarding the intensity of a disturbance in the flow using the determined amplitude of the side lobe.

26. The system of claim 24, wherein the signal analysis system is further configured to identify a side lobe of the voltage in the frequency domain; determine a center frequency of the side lobe; and determine information regarding a periodic frequency of a disturbance in the flow using the determined center frequency of the side lobe.

27. A system for obtaining information regarding a flow, comprising:
means for generating an alternating current signal at a carrier frequency in combination with a transformer, wherein the carrier frequency is selected so that the generated signal resonates;
means for causing a plasma to form across a gap;
means for measuring a voltage across the gap; and
means for determining the velocity of the flow based on the voltage across the gap.

28. The system of claim 27, wherein the means for measuring a voltage across the electrode gap comprises:
means for receiving an amplitude modulated signal transmitted as a result of the plasma formed across the gap.

29. The system of claim 27, further comprising:
means for monitoring the plasma; and
means for adjusting one or more parameters of the means for generating an alternating current signal based on the monitoring, wherein the one or more parameters include one or more of the carrier frequency and an amplitude of the signal generated.

30. The system of claim 27, further comprising:
means for causing a constant current plasma to form across a gap between at least a second pair of two electrodes;
means for measuring a voltage across the gap between the at least second pair of electrodes; and
means for determining information regarding the direction of the flow based on the voltage across the gap between the two electrodes and voltage across the gap between the at least second pair of electrodes.

31. The system of claim 27, wherein the means for determining the velocity of the flow comprises:
means for converting the measured voltage from a time domain to a frequency domain;
means for determining the amplitude of the signal in the frequency domain at the carrier frequency; and
means for determining the velocity of the flow using the determined amplitude of the signal at the carrier frequency.

32. The system of claim 31, wherein the means for determining the velocity of the flow further comprises:
means for identifying a side lobe of the voltage in the frequency domain;
means for determining the amplitude of the side lobe;
means for determining information regarding the intensity of a disturbance in the flow using the determined amplitude of the side lobe.

33. The system of claim 31, wherein the means for determining the velocity of the flow further comprises:
means for identifying a side lobe of the voltage in the frequency domain;
means for determining a center frequency of the side lobe;
means for determining information regarding a periodic frequency of a disturbance in the flow using the determined center frequency of the side lobe.

* * * * *